United States Patent [19]

Watanabe et al.

[11] Patent Number: 4,894,681
[45] Date of Patent: Jan. 16, 1990

[54] IMAGE READER

[75] Inventors: Yutaka Watanabe; Hideaki Kusano; Masaaki Ito, all of Osaka, Japan

[73] Assignee: Minolta Camera Kabushiki Kaisha, Osaka, Japan

[21] Appl. No.: 370,156

[22] Filed: Jun. 22, 1989

Related U.S. Application Data

[63] Continuation of Ser. No. 194,921, May 17, 1988, abandoned.

[30] Foreign Application Priority Data

May 21, 1987 [JP] Japan .................................. 62-125343
Sep. 30, 1987 [JP] Japan .................................. 62-244250

[51] Int. Cl.$^4$ ...................... G03B 13/28; G03B 27/80; G03B 23/08
[52] U.S. Cl. ......................................... 355/45; 355/68; 353/27 R
[58] Field of Search ................ 355/45, 68, 69; 353/27

[56] References Cited

U.S. PATENT DOCUMENTS 4,286,864 9/1981 Lysle et al. ...................... 355/45 X
4,339,182 7/1982 Ueda et al. ...................... 355/45 X
4,591,264 5/1986 Ueda et al. ............................ 355/68

FOREIGN PATENT DOCUMENTS 62-5764 1/1987 Japan .

Primary Examiner—Donald A. Griffin
Attorney, Agent, or Firm—Burns, Doane, Swecker & Mathis

[57] ABSTRACT

An image reader is disclosed which is provided with a screen for an image recorded on a microfilm to be projected thereon and a photoelectric transferring element for transforming the image into electric signals. In a light path originating in a light source and reaching the photoelectric transferring element, a beam attenuating filter for attenuating the luminous energy of the beam of light exposed on the photoelectric transferring element is disposed and used for decreasing the difference in the illuminance of the light source during the reader mode for causing the image to be projected on the screen and during the transforming mode for causing the image to be exposed on the photoelectric transferring element. The illuminance of the light source is controlled by the variation of the intermittent frequency of the voltage applied to the light source. While the operation is proceeding in the transferring mode, the illuminance of the light source is controlled with the aforementioned intermittent frequency falling within the range of sonic frequency so as to permit variation of the illuminance of the light source in a multiplicity of stages. While the operation is in this mode, the sound of the movable components of the device being operated for scanning cancels the noise generated within the range of sonic frequency.

20 Claims, 5 Drawing Sheets

IMAGE READER

This application is a continuation of application Ser. No. 194,921, filed May 17, 1988, and now abandoned.

BACKGROUND OF THE INVENTION

1. Field of the Invention:

This invention relates to an image reader for reading an image recorded on a microfilm. More particularly, this invention relates to an image reader which possesses a function of projecting an image on the microfilm onto a screen by virtue of light from a light source and a function of transforming the image into electric signals with a photoelectric transferring device.

2. Description of the Prior Art:

Such an image reader as disclosed in Japanese Patent Laid-Open SHO No. 62(1987)-5,764, for example, is used for the purpose of projecting onto a screen a prescribed image retrieved from a multiplicity of images recorded on a microfilm and storing the retrieved image in a memory medium such as a laser disc or printing the image. The image reader of this principle is basically provided with a screen for receiving a projected image, a photoelectric transferring element such as a CCD (charge coupled device) for transforming the exposed image into electric signals, and an image sensor or line sensor. This image reader incorporates therein a movable switching mirror capable of alternate selection between a reader optical path for projection of the image on the screen and a transforming optical path for projection of the image on the aforementioned photoelectric transferring element. These two optical paths are formed with one and the same light source.

When the image is to be projected on the screen, the illuminance of the light source must be fixed on the order of 300 to 500 luxes in order that an operator will be allowed to make an effective observation of the image. In contrast, the CCD as a photoelectric transferring element is saturated by exposure to a illuminance of about 30 to 40 luxes. When it is exposed to a illuminance exceeding this level, it is no longer able to transfer an image information into electric signals. The CCD, therefore, must be adapted so as to be exposed to the image with an illuminance not exceeding this level. Particularly when an image containing a photographic information of halftone pattern recorded in a microfilm is to be exposed on the photoelectric transferring element, the luminous energy of the light source must be extremely lowered as compared with that required for the reader mode. To permit the notable alteration of the luminous energy during the reader mode for the projection of the image on the screen and during the transferring element, therefore, the voltage applied to the light source must be changed very largely. This change in the volatage supply has been a major cause for early termination of the service life of the power source.

During the transfer of an image information on a microfilm into electronic signals, the brightness of the light source must be varied in a multiplicity of stages so that the light of the optimum luminous energy conforming with the density of the aforementioned image will be always exposed onto the photoelectric transferring element, with the illuminance kept within a range lower than that required during the projection of the image on the screeen. The light source must be adapted so that even during the projection of the image on the screen, the operator will be allowed to vary the brightness of the light emitted thereby. This control of the brightness of the light source is effected by actuating a switching element with a control signal issued from a microcomputer thereby varying the proportions of the time during which a prescribed voltage is applied by the power source to the light source and the time during which the application of the voltage is absent so as to permit regulation of average magnitude of the voltage supplied to the light source.

In the conventional image reader constructed as described above, while the image reader is in operation, particularly in the aforementioned reader mode, the operator is compelled to feel offensive noise because the movable members of the image reader are kept immobilized. It has been demonstrated that this noise is caused by the ON-OFF frequency of the aforementioned switching element which is operated for the control of the luminous energy or illuminance of the light source. To be specific, the aforementioned ON-OFF frequency or the intermittent frequency is so set that during the transferring mode, the luminous energy will be varied in 500 stages, depending on the density of the image. This frequency happens to fall within the range of sonic frequency. The noise occurs because the control of the luminous energy during the reader mode is carried out in the same range of frequency.

SUMMARY OF THE INVENTION

An object of this invention is to provide an image reader which is provided with a beam attenuating filter capable of decreasing the amount of light to be used during the exposure of an image on a photoelectric transferring element so as to decrease the difference of illuminance of the light source durding the exposure of the imgage on a screen and during the exposure of the image on the photoelectric transferring element.

Another object of this invention is to provide an image reader which is provided with a sole light source of a long service life capable of decreasing the differrence between the iluminance required for the projection of the image on the screen and the illuminance of a notably lower magnitude than that of the aforementioned illuminance required for the exposure of the image on the photoelectric transferring element.

Still another object of this invention is to provide an image reader which enables the intermittent frequency of the voltage applied to the light source, during the projection of the iamge on the screen to be controlled outside the range of sonic frequency so that the operator will be prevented from feeling frequency noise.

Yet another object of this invention is to provide an image reader which enables the intermittent frequency of the voltage applied to the light source, during the exposure of the image on the photoelectric transforming so as to permit change of the illuminance of the light source in a multiplicity of stages and causes the frequency noise to be cancelled with the sounds of the movable members of the image reader used for scanning so as to prevent the operator from feeling the noise.

In accordance with the present invention, there is provided an image reader for reading an image from a microfilm having images recorded thereon, which image reader comprises: a light source for illuminating the images recorded on the microfilm; a screen for the image to be projected as magnified thereon; photoelectric transferring means for emitting electric signals in response to the amount of light impinging thereon; a first projecting light path for causing a beam of light emitted from the light source and passed through the image on the microfilm to be projected on the screen; a second projecting light path for causing the beam of light emitted from the light source and passed through the image on the microfilm to be exposed on the photoelectric transferring means; and beam attenuating means disposed on the second projecting light path and adapted to attenuate the luminous energy of the light emitted from the light source and exposed on the photoelectric transferring means.

Further in accordance with the present invention, there is provided an image reader for reading an image from a microfilm having images recorded thereon, which image reader comprises: a light source for illuminating the images recorded on the microfilm; application means for applying a voltage to the light source; frequency varying means for varying the frequency of the voltage being applied to the light source by the application means; photoelectric transferring means for issuing electric signals in response to the luminous energy of the light impinging thereon; a screen for causing the image recorded on the microfilm to be projected as magnified thereon; a first projecting light path for causing a beam of light emitted from the light source and passed through the image recorded on the microfilm to be projected on the screen; a second projecting light path for causing the beam of light emitted from the light source and passed through the image on the microfilm to be exposed on the photoelectric transferring means; switching means for selective swithcing between the first projecting light path and the second projecting light path, and controlling means for controlling the frequency varying means so as to select the frequency of the voltage applied to the light source outside the range of sonic frequency when the switching means has selected the first projecting light pass inside the range of sonic frequency when the switching means has selected the second projecting light path.

And further in accordance with the present invention, there is provided an image reader for reading an image from a microfilm having images recorded thereon, which image reader comprises: a light source for illuminating the image on the microfilm; application means for applying a pulse voltage to the light source; frequency varying means for varying the frequency of the pulse voltage applied to the light source by the application means; voltage varying means for varying the applied voltage by causing variation of the pulse duty factor of the pulse voltage applied to the light source by the application means; a screen for the image recorded on the microfilm to be projected as magnified thereon; photoelectric transferring means for issuing electric signals in response to the luminous energy of the light impinging thereon; a first projecting light path for causing a beam of light emitted from the light source and passed through the image on the microfilm to be projected on the screen; a second projecting light path for causing the beam of light emitted from the light source and passed through the image on the microfilm to be exposed on the photoelectric transferring means; image density detecting means for detecting the density of the image on the microfilm being exposed on the photoelectric transferring means by the second exposed light path; switching means for selectively switching the first projecting light path and the second projecting light path; and controlling means for controlling the frequency varying means so as to adjust the pulse voltage applied to the light source to a level falling outside the ragne of sonic frequency when the switching means has selected the first projecting light path and then controlling the frequency varying means so as to adjust the pulse voltage applied to the light source at a level falling within the range of sonic frequency when the switching means has selected the second projecting light path and thereby controlling the voltage varying means in accordance with the image density detected by the image density detecting means.

BRIEF DESCRIPTION OF THE DRAWINGS

FIG. 2;

DESCRIPTION OF THE PREFERRED EMBODIMENTS

Figure 1:
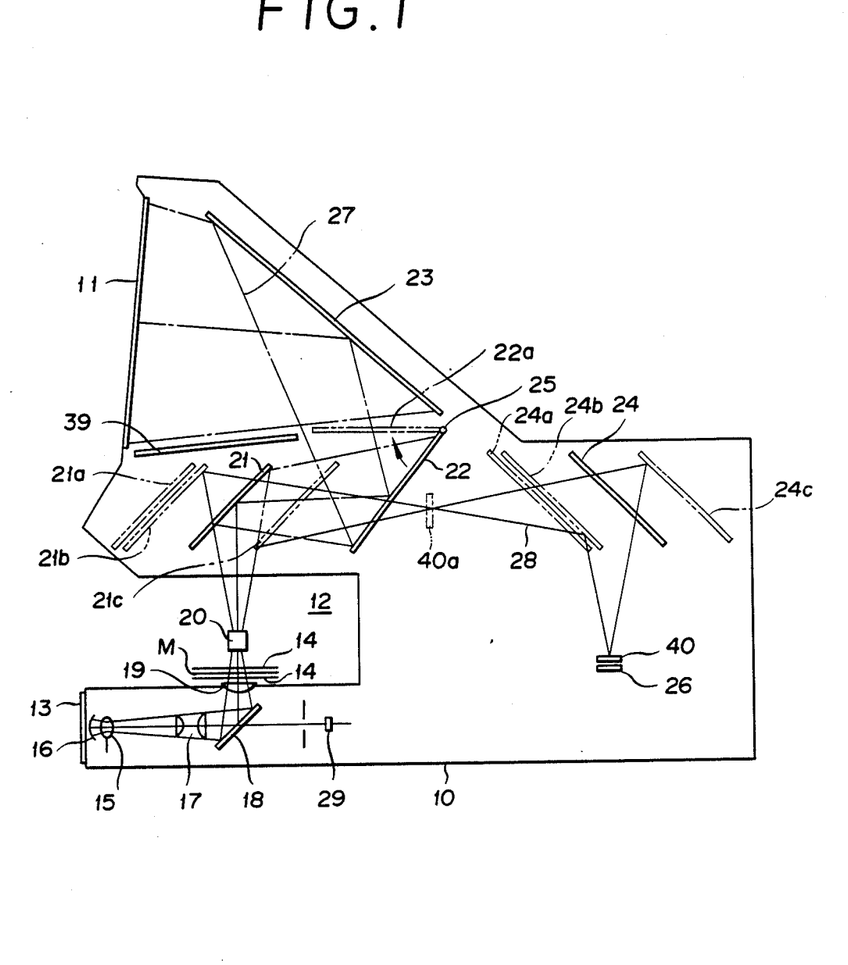
FIG. 1 is a cross section illustrating an image reader embodying the present invention.
Figure 2:
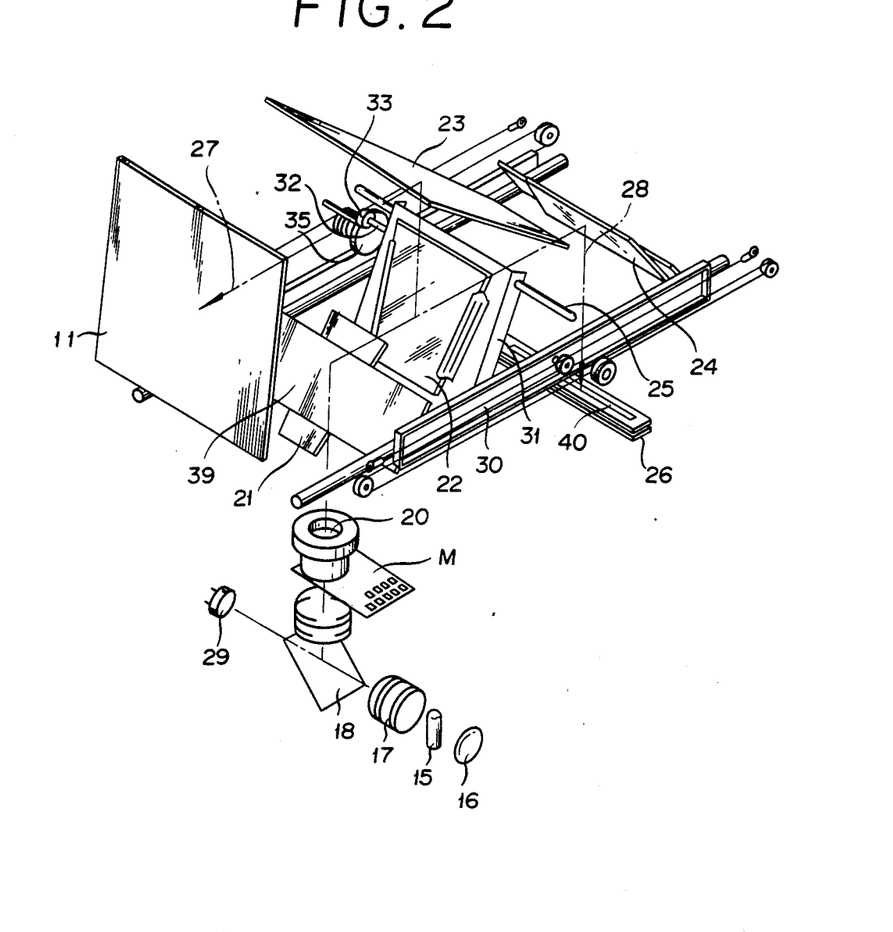
FIG. 2 is a perspective view illustrating the internal structure of the image reader of FIG. 1.

As illustrated in FIG. 1, a screen 11 is disposed in the front upper part of a case 10 constituting itself the image reader body and a recess 12 is formed below the screen 11. A console panel 13 is located on the front side below the recess 12. Above the console panel 13, a film carrier 14 for movably supporting thereon a microfilm M is attached. Though a microfilm of the microfiche type is illustrated in FIG. 2, this invention permits use of a roll type microfilm. When the roll type microfilm is adopted, the film carrier 14 of a type different from that illustrated herein is used. As a light source for illuminating the microfilm M supported on the film carrier 14, a halogen lamp 15 is disposed inside the reader body 10. The beam of light emitted from the halogen lamp 15 is reflected partly by a reflecting mirror 16. The reflected beam and the beam of light directly radiated from the halogen lamp 15 are together collected by a movable condenser lens 17, reflected by a reflecting mirror 18 located below the film carrier 14, passed through a stationary condenser lens 19, and brought to a beam projecting lens 20 disposed inside the aforementioned recess 12.

Inside the image reader body 10, a first mirror 21 illuminated by a projected light path passed through a zoom projection lens 20, a second mirror 22 rotated about a shaft 25 and, at the reader position indicated by a continuous line, illuminated by the projected light path reflected by the mirror 21 mentioned above, and a third mirror 23 illuminated by the projected light path reflected by the mirror 22 and adapted to project the impinging projected light path as diverged on the screen 11 mentioned above. While the second mirror 22 is held at the reader position indicated by the continuous line, there is formed a reader light path 27 indicated by an alternate one-dot one-dash line in the diagram for an image recorded on the microfilm M to be projected as magnified on the screen 11.

An operator keeps watch on images sucessively projected on the screen 11 and retrieves and confirms a desired image from the multiplicity of images recorded in the microfilm M. Where the retrieved image is to be operated, for example, such operating data for readout as the kind of microfilm, the density, range, the difference between a photographic image and an image of white and black areas as in a character, and the ratio of magnification are set by the operator's manipulation of the console panel 13.

A fourth mirror 24 is disposed inside the image reader body 10 as opposed to the first mirror 11 in a substantially perpendicular relation thereto. Below the fourth mirror 24, a photoelectric transferring element 26 formed of CCD (charge coupled device), for example, is attached. When the second mirror 22 is rotated to the position indicated by an imaginary line in FIG. 1, there is formed a transforming light path 28 indicated by a continous line. Consequently, an image recorded on the microfilm M is exposed on the photoelectric transferring element 26, there to be transformed into electric signals. The electric signals emitted from the photoelectric transferring element 26 are forwarded to and stored in an optical disc recording medium (not shown) or forwarded to a printer such as a laser printer and processed for the production of a hard copy.

For detection of scintillation of a light source while the halogen lamp 15 is glowing, a sensor 29 is disposed inside the image reader proper 10. By a detection signal issued from this sensor 29, a treatment necessary for elimination of the scintillation is performed on the lamp 15.

The first mirror 21 and the fourth mirror 24 are adapted so as to be synchronously moved in the horizontal direction as indicated in FIG. 1. These mirrors 21, 24 are moved as guided by a scanning table 30 indicated in FIG. 2. When the first mirror 21 reaches the leftmost end position indicated by an imaginary line 21a in FIG. 1, the fourth mirror 24 automatically assumes the leftmost end position indicated by an imaginary line 24a. Conversely when the first mirror 21 reaches the rightmost end position indicated by an imaginary line 21c, the fourth mirror 24 automatically assumes the rightmost end position indicated by an imaginary line 24c.

Before the first mirror 21, for example is scanned for the operation of transformation, it is given a preliminary scanning for detection of the density of images recorded on the microfilm M. This preliminary scanning is accomplished by causing the first mirror 21 to be moved from the home position indicated by the continuous line to the position indicated by the imaginary line 21a and the fourth mirror 24 to be moved synchronously from the position indicated by the continuous line to the position indicated by the imaginary line 24a while keeping the second mirror 22 set at the retracted position or the position of transforming mode indicated by an imaginary line 22a in FIG. 1. During the preliminary scanning, the beam of light from the projection lens 20 which has passed through the microfilm M is reflected by the first mirror 21 and the fourth mirror 24 and exposed on the photoelectric transferring element 26. The photoelectric transferring element 26, proportionately to the amount of light impinging thereon or the density of the image of the microfilm M, issues electric signals as a sampling data on density to a microcomputer CPU. The microcomputer CPU analyzes the introduced data on density and issues a contol signal through a drive circuit to the exposure lamp 15 so as to set the voltage of the lamp to a value proper for the image of the density. During the course of the preliminary scanning, the first mirror 21 and the fourth mirror 24 are moved each to roughly one half of the entire stroke thereof as described above. Otherwise, these two mirrors may be so adapted that during the course of the preliminary scanning, the first mirror will be moved from the position 21a to the position 21c and, at the same time, the fourth mirror will be moved from the position 24b to the position 24c. In this arrangement, the preliminary scanning is allowed to obtain more accurate data on image density.

The transferring mode which comprises projecting an image recorded in a microfilm M on the photoelectric transferring element 26 thereby transforming the image information into electric signals is not initiated until the first mirror 21 is moved from the position indicated by the imaginary line 21a in the reverse direction to the start position indicated by the imaginary line 21b. The requirement that the scanning of the image on the photoelectric transferring element 26 should be initiated only after the first mirror 21 has been moved over a prescribed distance is indispensable for the purpose of ensuring a rise in the scanning speed of the first mirror 21 and the fourth mirror 24 and also for the purpose of liberating the first and fourth mirrors 21, 24 from the influence of the vibration otherwise possibly infricted thereon during the reverse movement thereof. The image in one frame of the microfilm M is completely projected on the photoelectric transferring element 26 by causing the first mirror 21 to be moved along the scanning base 30 from the start position 21b past the home position to the terminal position 21c and, at the same time, causing the fourth mirror 24 to be synchronously moved from the start position 24b past the home position to the terminal position 24c.

The start position 21b for the first mirror 21 or the start position 24b for the fourth mirror 24 coincides with the fixed position at which the image is projected on the screen 11. The terminal position 21c for the first mirror 21 or the terminal position 24c for the fourth mirror 24 is variable with the size of the image recorded on the microfilm M. If the position indicated by the imaginary line 21c happens to be the terminal position in the lateral direction of an image corresponding to an original of A4 size, for example, then the terminal position in the longitudinal direction of the same image will fall farther to the right from the position 21c in FIG. 1. This setting of the image size is effected on each given image or original by the operator manipulating relevant switches located on the console panel 13 mentioned above. The control of the rightmost end position set as described above is accomplished by controlling the rotational speed of the motor (not shown) for producing a synchronous movement of the mirrors 21, 24.

The image signals which have been transformed into electric signals through the medium of the photoelectric transferring elements 26 are forwarded through a sample holder, an amplifying circuit, an A/D converter, and a comparator and introduced as an input into an optical disc memory medium or a laser printer. After the transformation is completed, the first mirror 21 and the fourth mirror 24 are returned to their home positions from the respective terminal positions 21c and 24c. Since the speed of their return is set at about one half of the speed during the transferring mode, these mirrors 21, 24 have a small inertia during their movement and, therefore, are allowed to be brought to a perfect stop at the home positions. When the mirrors 21, 24 return to their home positions, the second mirror 22 is automatically rotated from the retracted position 22a indicated by the imaginary line to the reader position indicated by the continuous line.

Now, the mechanism for generating the rotation of the second mirror 22 from the reader position indicated by the continuous line to the retracted position or the transforming position indicated by the imaginary line 22a in FIG. 1 will be described below with reference to FIGS. 3a to 3c.

Figures 3A, 3B, 3C, 4:
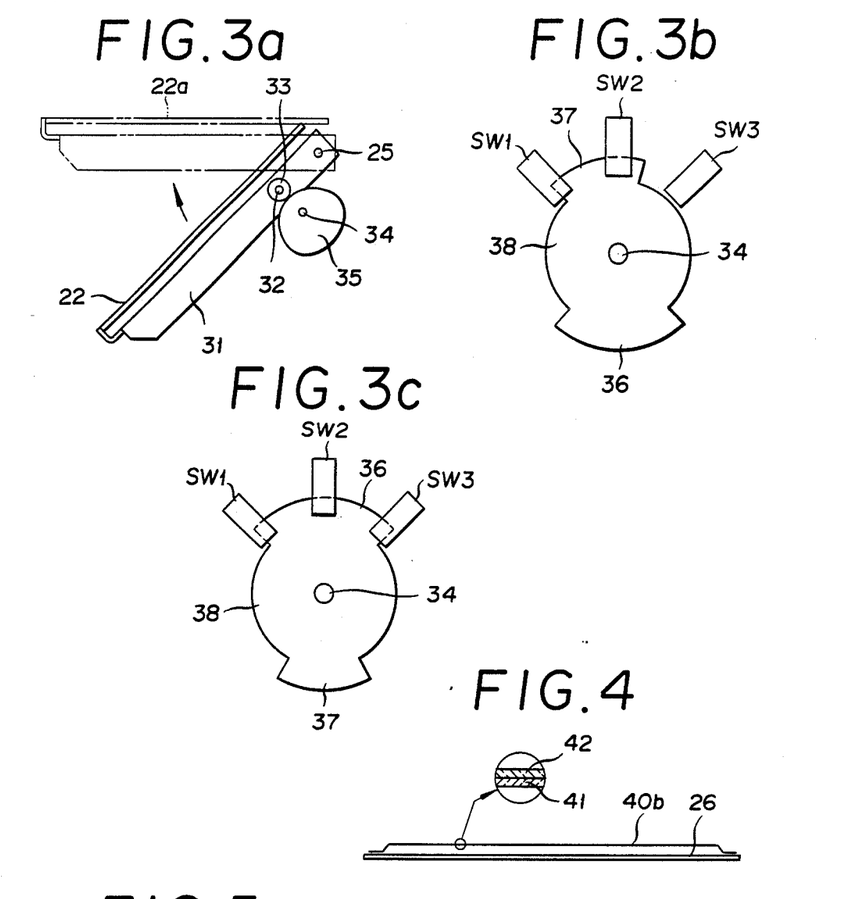
FIG. 3a is a side view illustrating cam mechanism for rotating a second mirror appearing in FIG. 1.
FIG. 3b is a side view illustrating the positional relation between an operating plate and switches when the second mirror assumes the position for the reader mode.
FIG. 3c is a side view illustrating the positional relation between the operating plate and the switches when the second mirror assumes the retracted position during the transferring mode.
FIG. 4 is a cross section illustrating a beam attenuating filter integrated with a photoelectric transferring element.

A retaining member 31 for keeping the second mirror 22 in position is rotatably attached to the image reader body 10 through the medium of the rotary shaft 25 disposed in the basal part as illustrated in FIG. 3a and FIG. 2. This retaining member 31 is provided with a cam follower 33 rotatably attached to a shaft 32. The cam follower 33 is held in contact with the peripheral surface of a cam 35 which is fixed on a rotary shaft 34. In this setup, the second mirror 22 is caused by the rotation of the cam 35 to be swung between the reader position indicated by the continuous line and the retracted position indicated by the imaginary line 22a and, at the same time, fixed at either of the two positions mentioned above through the medium of the cam follower 33 and the retaining member 31.

The rotary shaft 34 is interlocked with a drive motor (not shown). As illustrated in FIG. 3b and FIG. 3c, an operating plate 38 from which two detecting projections 36, 37 differing in length in the direction of rotation are projected is fixed on the rotary shaft 34. A first switch SW1, a second switch SW2, and a third switch SW3 are disposed for the detection of the positions of these detecting projections 36, 37. When the second mirror 22 is held at the reader position, the first switch SW1 and the second switch SW2 are turned off by the detecting projection 37 as illustrated in FIG. 3b. Conversely, when the second mirror 22 is held in the retracted position mentioned above, all the switches SW1 through SW3 are turned off by the detecting projection 36 as illustrated in FIG. 3c. The position of the second mirror 22 is detected by the signals from these switches, to effect the control of the motor necessary for the driving of the rotary shaft 34.

Inside the image reader body 10, a shielding plate 39 for partitioning the first mirror 21 and the screen 11 from each other is fixed inside the image reader body 10.

A beam attenuating filter 40 is disposed immediately in front of the photoelectric transferring element 26 as illustrated in FIG. 1. The beam attenuating filter 40 serves the purpose of intercepting the external light entering the image reader body 10 through a gap and consequently preventing the photoelectric transferring element 26 from being adversely affected by the external light. Thus, it brings about an advantage that the reader body or the case 10 is not required to be formed as a dark box in the strict sense of the word but may be produced in a low-cost structure.

As illustrated in FIG. 1, the beam attenuating filter 40 is disposed directly in front of the photoelectric transferring element 26. Alternatively, a beam attenuator 40a may be disposed between the first mirror 21 and the second mirror 22 at a position where the transforming light path 28 intersects as indicated by the imaginary line in FIG. 1. In this case, the beam attenuating filter 40a has an advantage of being formed in a reduced width. Optionally, a beam attenuating filter may be formed by subjecting the surface of the fourth mirror 24 to a beam attenuating treatment such as, for example, a coating treatment.

FIG. 4 is a diagram illustrating another typical beam attenuating filter 40b embodying the present invention. This beam attenuator 40b is composed of a protective cover 41 made of glass and adapted to cover the photoelectric transferring element 26 and a coating layer 42 superposed on the surface of the protective cover 41. It is by the coating layer 42 that the beam attenuation aimed at is accomplished.

It is permissible to use simultaneously a plurality of beam attenuating films of varying types described above.

Figure 5:
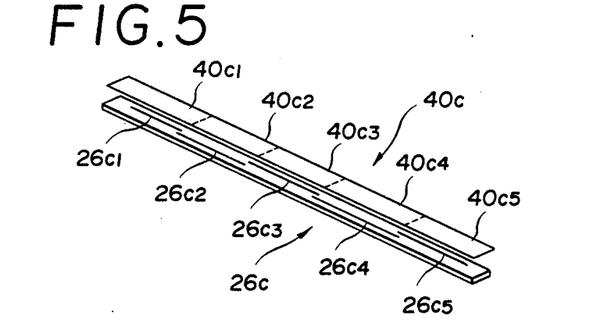
FIG. 5 is a perspective view illustrating a strip of photoelectric transforming element and a beam attenuating filter integrated therewith.

FIG. 5 is a diagram illustrating a strip of photoelectric transferring element 26c and a beam attenuating filter 40c integrated therewith. In the illustrated embodiment, the photoelectric transferring element 26c is formed by arranging five photoelectric transferring pieces 26c1 to 25c5. Where the long strip of photoelectric transferring element 26c is formed by using the plurality of transferring pieces 40c1 to 40c5 as described above, dispersion of sensitivity inevitably arises among the individual transferring pieces. The difference of sensitivity has heretofore been eliminated by electric adjustment of an amplifying circuit. Accurate uniformization of the sensitivity through delicate regulation, however, has never been fully attained by the electric adjustment.

As illustrated in FIG. 5, therefore, the beam attenuating filter 40c is disposed directly in front of the photoelectric transferring element 26c and this beam attenuating filter 40c is formed of five filter parts 40c1 to 40c5 possessing beam attenuating properties and transmittances of their own corresponding to the degrees of sensitivity owned by the individual elements 26c1 to 26c5. This setup has an advantage that the entire sensitivity of the long strip of photoelectric transferring element 26c can be infallibly uniformized throughout the entire length thereof.

To retrieve a desired image recorded on the microfilm M, the operator is required to project the images recorded on the microfilm M successively on the screen 11 searches for the particular image. During the course of this retrieval, the second mirror 22 is set at the reader position indicated by the continuous line and the voltage supplied to the halogen lamp 15 is controlled in such a manner that the illuminance of the light source will fall in the range of 300 to 500 luxes. This voltage is set by the proportions of the time in which the prescribed maximum voltage is applied to the lamp 15 and the time in which this application is absent, namely the average voltage to be decided by the pulse duty factor. The setting of this duty factor and that of the ON-OFF frequency are both effected by the microcomputer CPU. The microcomputer CPU is furnished with a timer or counter for counting the time in which the voltage is applied to the lamp 15 and a timer or counter for counting the time in which the application of the voltage is suspended.

After the particular image of interest to be transformed into electric signals has been retrieved from the multiplicity of images recorded on the microfilm M and set on the screen 11, the transformation of this image is accomplished by keeping the second mirror 22 at the transferring mode position indicated by the imaginary line in FIG. 1, carrying out the preliminary scanning mentioned above, and then exposing the image on the photoelectric transferring element. Since the photoelectric transferring element 26 is saturated with an illuminance of 30 to 40 luxes, the illuminance must be kept at a level lower than the order mentioned above during the course of the projection. Since the image reader of the present invention is provided with the beam attenuating filter 40, it does not require the illuminance of the halogen lamp 15 in the transferring mode to be extremely lowered as compared with the illuminance used in the reader mode. As the result, the voltage to be supplied to the halogen lamp 15 is not different appreciably in the reader mode and in the transferring mode and the lamp 15 is enabled to enjoy its long service life.

When an image recorded on the microfilm M is exposed via the transforming light path 28 onto the photoelectric transferring element 26, the luminous energy of the halogen lamp 15 or the magnitude of the voltage supplied to the halogen lamp 15 must be varied in a multiplicity of stages to suit the density of the image. When the beam attenuating filter 40 is used as described above, since the maximum illuminance or the magnitude of voltage in the transferring mode is allowed to be higher than when no beam attenuating filter is used and, therefore, the luminous energy of the lamp 15 confor- mity with the density of the image can be controlled with high accuracy. The control of the luminous energy is accomplished by varying the ON-OFF intervals or the pulse duty factor of the halogen lamp 15. For the control of the luminous energy in the multiplicity of stages, the present invention adopts the system of pulse width modulation (PWM). Owing to the adoption of this system, the control in the multiplicity of stages can be carried out by faithfully following the operation of the photoelectric transferring element 26 of a very high speed of response while suffering only minimally from variation of illuminance.

In the PWM control of the luminous energy of the halogen lamp 15, the error of illuminance from the set reference value can be confined within the allowable range of 1 to 2% when the aforementioned ON-OFF frequency is above a level of 2.5 KHz or 3 KHz. It has been customary for the control of the illuminance of the halogen lamp to be effectd with a frequency on the order, of 8 KHz. When the ON-OFF control of the halogen lamp 15 is effected with the frequency of about 8 KHz for the purpose of enabling the beam of light having the optimum luminous energy to be used in the projection of the image on the photoelectric transferring element 26 as described above, the power source is allowed to emit a sound of vibration of a fixed frequency and this sound of vibration offends the operator's ears where the image reader is used in a very quiet place particularly in the reader mode. This is because the frequency for the PWM control happens to fall in the range of the sonic frequency.

For the exposure of a varying image retrieved from the microfilm M on the photoelectric transferring element 26, the ratio of the ON time to the ON-OFF time of the light source or the pulse duty factor must be varied in about 500 stages in the range of 0 to 100%. Where the variation in the 500 stages is to be realized with a frequency falling outside the range of sonic frequency such as, for example, 20 KHz, the frequency to be used for the counting operation by the counter mentioned above will be as follows.

20 KHz × 500 (stages) = 10,000,000 Hz

As things stand now, however, the counting operation with this frequency cannot be obtained by the use of any microcomputer. Since the feasible frequency for the counting operations is approximately in the neighborhood of 4 MHz, the realization of the 500-stages adjustment with this frequency requires the frequency of PWM to be 8 KHz. In the circumstances, the PWM frequency must inevitably fall in the range of sonic frequency. It has been difficult, therefore, to curb the occurrence of the sound of vibraiton due to the PWM control.

In the reader mode for causing the image retrieved from the microfilm to be projected on the screen 11, the present invention contemplates feeding the halogen lamp 15 a power source with the voltage of a frequency of 20 KHz, for example, which falls outside the range of sonic frequency. As a result, the otherwise inevitable emission of noise from mechanical components of the device is completely eliminated even when the device is operated in the absolute absence of mechanical noise as in the reader mode operation. The illuminance of the screen 11 is varied by changing the pulse duty factor mentioned above within the range of this frequency.

In the transforming mode, since the illuminance must be controlled in as many as 500 stages to suit the variation of density of the images as mentioned above, the ON-OFF control of the halogen lamp 15 is effeced with a frequency falling in the range of sonic frequency. While the operation is proceeding in this mode, the mirrors 21, 24 are being scanned as described above and the sound emitted from the movable components of the device during the scanning operation serves the purpose of canceling the sound of vibraiton originating in the control frequency.

Figure 6:
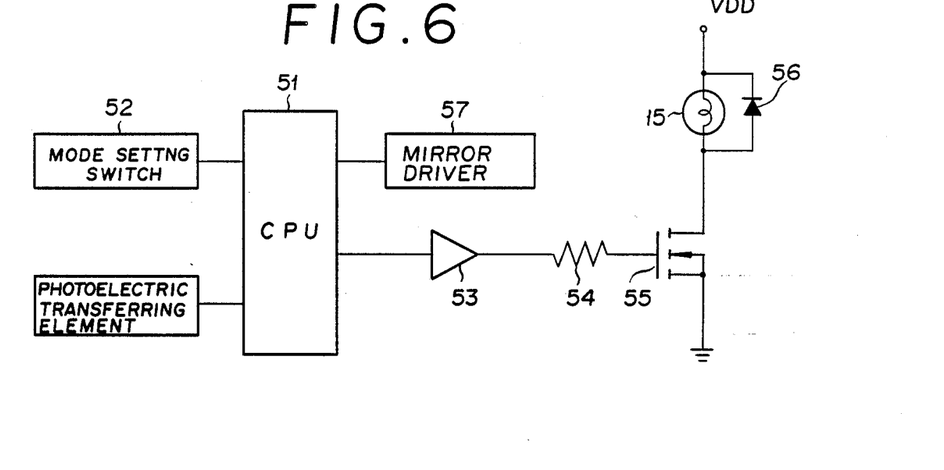
FIG. 6 is a block diagram illustrating a control circuit for the control of the image reader of this invention.

FIG. 6 is a block diagram showing the control effected by this invention on the ON-OFF frequency of the voltage applied to the halogen lamp 15. To a microcomputer (CPU) 51, a mode setting switch 52 adapted for alternate setting of the reader mode and the transferring mode is connected and the photoelectric transferring element 26 is further connected.

To the CPU 50, the gate of a field-effect transistor (FET) 55 is connected via an output buffer 53 and a resistor 54. With the pulse signals issued from the CPU 51, the gate of the FET 55 is turned ON (when the output of the CPU 51 is H) or turned OFF (when the output of the CPU 51 is L). The drain of the FET 55 is connected to the halogen lamp 15 and the source thereof grounded. When the gate is turned on to establish connection between the drain and the source, the halogen lamp 15 is turned on. When the gate is turned off to break the connection, the halogen lamp is turned off. A diode 56 is connected to the opposite terminals of the halogen lamp 15 for the absorption of the surge voltage which possibly arises during the ON-OFF flow of the electric current to the halogen lamp 15.

The CPU 51 has two timers or counters incorporated therein. One of the counters serves the purpose of counting the time for keeping the halogen lamp 15 glowing and the other counter the purpose of counting the time for keeping the halogen lamp 15 off. On the basis of the sums of time thus counted, the proportion of the ON time accounted for in the combined ON-OFF time or the pulse duty factor is calculated by the signal from the photoelectric transferring element 26 during the course of the preliminary scanning and the outcome of the calculation is used for the control of the illuminance of the halogen lamp 15. Further, a mirror driving member 57 such as a motor for imparting rotation to the second mirror 22 is connected to the CPU 51. The operation of the mode setting switch 52 produces signals for the mirror driving member 57 and causes the second mirror 22 to be set at a prescribed position.

Figure 7:
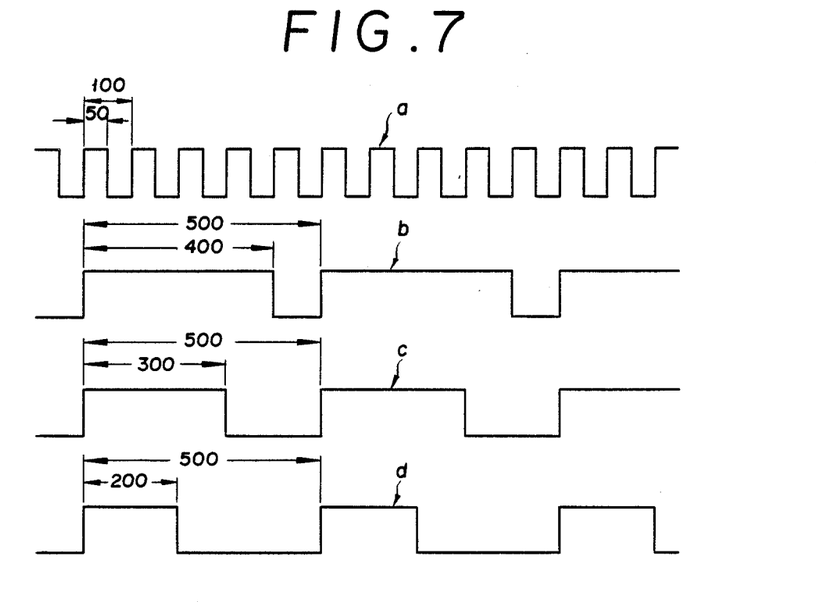
FIG. 7 is a time chart illustrating typical signal waveforms for the use in the control circuit.

FIG. 7 illustrates samples of the output waveform to be supplied by the CPU 51 to the lamp 15. The waveform a is a typical waveform for use in the reader mode. When the counting operation frequency of the two counters in the CPU 51 is 2 MHz, the voltage having an intermittent frequency of 20 KHz and a pulse duty factor of 0.5 will be applied to the halogen lamp 15 by setting the count value of each of the counters at 50. Since this frequency is outside the range of sonic frequency, the operator does not feel any offensive noise even while the device is in operation in the reader mode keeping the movable components of the device at rest.

The waveforms b to d shown in FIG. 7 are samples of the output waveform for use in the transferring mode. While the device is operated in this mode, the total of count values of the two counters is set at 500 so as to permit control of the illuminance of the lamp 15 in 500 stages. The FET 55, threfore, is alowed to produce a switching motion with a frequency of 4 KHz and the voltage having an intermittent frequency of 4 KHz and the voltage having an intermittent frequency of 4 KHz falling in the range of sonic frequency is applied to the halogen lamp 15. Since the first mirror 21 and other components are moved for the scanning which is performed in preparation for the transformation of image, the sound generated by their motion cancels the intermittent frequency mentioned above, with the result that the operator will not feel any offensive noise. By changing the pulse duty factor as illustrated by the waveforms b to d, the average voltage supplied to the lamp 15 can be varied and the illuminance of the lamp 15 accordingly varied.

Figure 8:
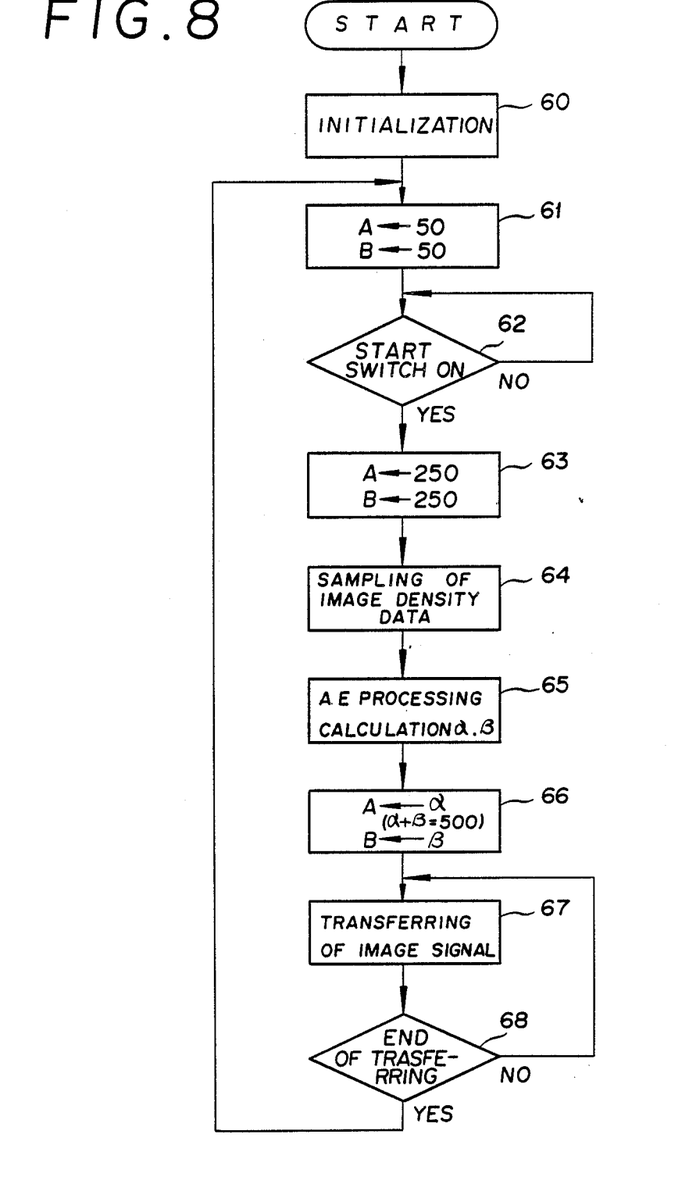
FIG. 8 is a flow chart illustrating the control contemplated by the present invention.

FIG. 8 is a flow chart illustrating a typical control contemplated by the present invention. Now, the procedure for the operation of the image reader of the present invention will be described with reference to this flow chart.

As the program is started, the CPU 51 assumes an initially set state and the count values of the two counters in the CPU 51 are set each at 0 as indicated at the step 60 to establish a reader mode. Then as indicatd at the step 61, the value 50 is introduced into each of the two counters, Counter A and Coutner B. When this value is set in each of the counters and the frequency of the counting operation of Coutner A and that of Counter B is set at 2 MHz, the FET 55 is allowed to produce a swithcing motion with a frequency, 2 MHz/50+50=20 KHz. In other words, the CPU 51 continues to issue the signal "H" until Counter A complete countdown. Then, the CPU 51 continues to issue the signal "L" to the FET 55 until Counter B completes countdown. To the halogen lamp 15, therefore, the voltage of a waveform indicated by the symbol a in FIG. 7 possessing an intermittent frequency of 20 KHz and a pulse duty factor of 0.5 is applied. Since this frequency is outside the range of sonic frequency, the operator does not hear the sound of vibration generated during the operation.

In the embodiment described above, Couner A and Coutner B are described as adapted to receive the count value of 50 each. The count values to be set in Counter A and Counter B can be freely selected at the step 61 by the operator manipulating relevant knobs (not shown) installed on the console panel 13 so as to produce a projected image on the screen 11 with desired brightness, on condition that the total of the count values selected should not exceed 100. Under the conditions described above, a desired image is retrieved by the operator from the multiplicity of images recorded on the microfilm M.

Where the retrieved image projected on the screen 11 is to be stored in the form of an image signal on an optical disc recording medium or to be reproduced as a hard copy with a printer, the start switch is turned on to initiate the preliminary scanning as indicated in the step 62. While the preliminary scanning is in progress, the illuminance of the halogen lamp 15 is set at the prescribed value so as to permit determination of the density of the images on the microfilm by the preliminary scanning. As shown at the step 63, the value of 250 is set each in Counter A and Counter B. In this case, the FET 55 is enabled to produce a switching motion with a frequency, 2 MHz/250+250=4,000 Hz. To the halogen lamp 15, therefore, the voltage having an intermittent frequency of 4 KHz falling in the range of sonic frequency and a pulse duty factor of 0.5 is applied. Immediately after this frequency is assumed by switching, the mechanical system is set moving for the purpose of the preliminary scanning. The mechanical sound issuing from the mechanical system cancels the sound of vibration generated druing the PWM control. The operator, therefore, does not feel any offensive noise even when the frequency is lowered. It is for the purpose of permitting multistage control that the frequency is lowered while the operation is proceeding in the transferring mode.

In the preliminary scanning, the first mirror 21 and the fourth mirror 24 illustrated in FIG. 1 are moved to the respective positions prescribed for the preliminary scanning and the data on density for the detection of image density is sampled by the photoelectric transferring element 26 as indicated at the step 64. By this sampling, the iluminance of the halogen lamp 15 required for causing the image recorded on the microfilm M to be exposed on the photoelectric transferring element 26 is decided.

The constant $\alpha$ and the constant $\beta$ required for the determination of the pulse duty factor are calculated given an AE processing by the CPU 51 at the step 65 on the basis of the data obtained by the sampling at the step 64. This calculation is carried out so that the sum of the constant $\alpha$ and the constant $\beta$ will be 500 and the intermittent frequency of the voltage applied to the halogen lamp 15 will be 4 KHz. This particular number 500 is used for the purpose of allowing the number of stages for the adjustmenet of the illuminance of the halogen lamp 15 to become 500. The constant $\alpha$ and the constant $\beta$ thus determined by the calculation are set respectively in Coutner A and Counter B (at the step 66).

When the constant α and the constant β to be found by the AE processing are assumed to be 400 and 100 respectively, the voltage of a waveform indicated by the symbol b in FIG. 7 possessing an intermittent frequency of 4 KHz and a pulse duty factor of 0.8 is applied to the halogen lamp 15. When the constant β is 300 and the constant α is 200, then, the voltage of a waveform indicated by the symbol c in FIG. 7 possessing an intermittent frequency of 4 KHz and a pulse duty factor of 0.6 is applied to the halogen lamp 15. When the constant α is 200 and the constant β is 300, the voltage of a waveform indicated by the symbol d in FIG. 7 possessing an intermittent frequency of 4 KHz and a pulse duty factor of 0.4 is applied to the halogen lamp 15. Thus, the voltage of a waveform possessing a fixed intermittent frequency of 4 KHz and varying pulse duty factor is applied to the halogen lamp 15, thus enabling the halogen lamp 15 to glow with a varying illuminance.

Then, the first mirror 21 and the fourth mirror 24 are moved toward the right as shown in FIG. 1 and the image on the microfilm M is exposed on the photoelectric transferring element 26 under the selected illuminance of the lamp 15. The light signal emitted by the element 26 is transformed in to electric image signals at the step 67 and fed out to an external device. When the aforementioned mirrors complete their scanning motion, the transferring mode is completed at the step 68. Then, the program is returned to the step 61. The halogen lamp 15, in preparation for the next reader operation, is turned on by the voltage possessing an intermittent frequency of 20 KHz and a pulse duty factor of 0.5.

While the operation is proceeding in the reader mode incapable of emitting any sound of the device, the intermittent frequency of the voltage applied to the halogen lamp 15 is set at a level of 20 KHz, for example, which falls outside the range of sonic frequency so that the operator does not feel any offensive noise of vibration. While the operation is proceeding in the transferring mode, the intermittent frequency of the voltage applied to the halogen lamp 15 is set at a level of 4 KHz, for example, which falls within the range of sonic frequency so that the intermittent is lower than in the reader mode to permit adjustmenet of the illuminance in the multiplicity of stages. While the operation is proceeding in this mode, since the movable component of the device are in motion, the operating sound of the mechanical system cancels the sound of vibration and the operator is prevented from feeling any offensive noise.

The embodiment of the present invention has been described as using a count frequency of 2 MHz for the aforementioned counters. Of course, the intermittent frequencies of the voltages applied to the halogen lamp 15 while the operation is proceeding in the reader mode and in the transferring mode respectively are not specifically limited on tee sole condition that the intermittent frequency of the voltage should fall outside the range of sonic frequency during the course of the reader mode and the intermittent frequency of the voltage should fall within the range of sonic frequency and enable the illuminance of the halogen lamp 15 to be adjusted in the multiplicity of stages as contemplated by the invention.

What is claimed is:

1. An image reader for reading an image from a microfilm having images recorded thereon, which image reader comprises:
   a light source for illuminating said images recorded on said microfilm;
   a screen for said image to be projected as magnified thereon;
   photoelectric transferring means for emitting electric signals in response to the amount of light impinging thereon;
   a first projecting light path for causing a beam of light emitted from said light source and passed through said image on said microfilm to be projected on said screen;
   a second projecting light path for causing said beam of light emitted from said light source and passed through said image on said microfilm to be exposed on said photoelectric transferring means; and
   beam attenuating means disposed on said second projecting light path and adapted to attenuate the luminous energy of the light emitted from said light source and exposed on said photoelectric transferring means.

2. An image reader according to claim 1, wherein said beam attenuating means is a pervious filter.

3. An image reader according to claim 2, wherein said filter is disposed immediately before said photoelectric transferring means.

4. An image reader according to claim 3, wherein said photoelectric transferring means is formed of a plurality of photoelectric transferring pieces arranged linearly and said filter is formed of a plurality of filter parts having permeability coefficients varied correspondingly to said photoelectric transferring pieces.

5. An image reader for reading an image from a microfilm having images recorded thereon, which image reader comprises:
   a light source for illuminating said images recorded on said microfilm;
   application means for applying a voltage to said light source;
   frequency varying means for varying the frequency of said voltage being applied to said light source by said application means;
   photoelectric transferring means for issuing electric signals in response to the luminous energy of the light impinging thereon;
   a screen for causing said image recorded on said microfilm to be projected as magnified thereon;
   a first projecting light path for causing a beam of light emitted from said light source and passed through said image recorded on said microfilm to be projected on said screen;
   a second projecting light path for causing said beam of light emitted from said light source and passed through said image on said microfilm to be exposed on said photoelectric transferring means;
   switching means for selective switching between said first projecting light path and said second projecting light path, and
   controlling means for controlling said frequency varying means so as to select the frequency of said voltage applied to said light source outside the range of sonic frequency when said switching means has selected said first projecting light pass inside the range of sonic frequency when said switching means has selected said second projecting light path.

6. An image reader according to claim 5, which further comprises detecting means for detecting the density of said image recorded on said microfilm and means for adjusting the voltage applied to said light source in conformity with the density of image detected by said detecting means.

7. An image reader for reading an image from a microfilm having images recorded thereon, which image reader comprises:
- a light source for illuminating said image on said microfilm;
- application means for applying a pulse voltage to said light source;
- frequency varying means for varying the frequency of said pulse voltage applied to said light source by said application means;
- voltage varying means for varying said applied voltage by causing variation of the pulse duty factor of said pulse voltage applied to said light source by said application means;
- a screen for said image recorded on said microfilm to be projected as masgnified thereon;
- photoelectric transferring means for issuing electric signals in response to the luminous energy of the light impinging thereon;
- a first projecting light path for causing a beam of light emitted from said light source and passed through said image on said microfilm to be projected on said screen;
- a second projecting light path for causing said beam of light emitted from said light source and passed through said image on said microfilm to be exposed on said photoelectric transferring means;
- image density detecting means for detecting the density of said image on said microfilm being exposed on said photoelectric transferring means by said second exposed light path;
- switching means for selectively switching said first projecting light path and said second projecting light path; and
- controlling means for controlling said frequency varying means so as to adjust the pulse voltage applied to said light source to a level falling outside the ragne of sonic frequency when said switching means has selected said first projecting light path and then controlling said frequency varying means so as to adjust the pulse voltage applied to said light source at a level falling within said range of sonic frequency when said switching means has selected said second projecting light path and thereby controlling said voltage varying means in accordance with the image density detected by said image density detecting means.

8. An image reader according to claim 7, which further comprises a pervious filter dispoed on said second projecting light path and adapted to attenuate the beam of light emitted from said light source and passed through said image on said microfilm.

9. An image reader for reading an image from a microfilm having images recorded thereon, which image reader comprises:
- a light source for illuminating said images recorded on said microfilm;
- a screen for said image to be projected as magnified thereon;
- photoelectric transferring means for emitting electric signals in response to amount of light impinging thereon;
- projecting means for causing a beam of light emitted from said light source and passed through said image on said microfilm to be projected on said screen;
- exposing means for causing said beam of light emitted from said light source and passed through said image on said microfilm to be exposed on said photoelectric transferring means; and
- beam attenuating means disposed in front of said photoelectric transferring means and adapted to attenuate the luminous energy of the light emitted from said light source and exposed on said photoelectric transferring means.

10. An image reader according to claim 9, wherein said beam attenuating means is a pervious filter.

11. An image reader according to claim 10, wherein said filter is disposed immediately before said photoelectric transferring means.

12. An image reader according to claim 11, wherein said photoelectric transferring means is formed of a plurality of photoelectric transferring pieces arranged linearly and said filter is formed of a plurality of filter parts having permeability coefficients varied correspondingly to said photoelectric transferring pieces.

13. An image reader according to claim 9, further comprising:
- mode selecting means for selecting a projecting mode wherein the image of the microfilm is projected on said screen by said projecting means and an exposing mode wherein the beam of light passed through said image on said microfilm is exposed on said photoelectric transferring means by said exposing means; and
- adjusting means for adjusting an amount of the light emitted by said light source in accordance with the mode selected by said mode selecting means so that the amount of the light in the projecting mode is larger than the amount of the light in the exposing mode.

14. An image reader according to claim 13, wherein said adjusting means effects the adjustment when the selected mode is changed by said mode selecting means.

15. An image reader for reading an image from a microfilm having images recorded thereon, which image reader comprises:
- a light source for illuminating said images recorded on said microfilm;
- a screen for said image to be projected as magnified thereon;
- projecting means for projecting an optical image of the microfilm on said screen;
- scanning means for scanning the optical image of the microfilm, which includes photoelectric transferring means for emitting electric signals in response to the amount of light impinging thereon; and
- beam attenuating means disposed in front of said photoelectric transferring means and adapted to attenuate the luminous energy of the light emitted from said light source and exposed on said photoelectric transferring means.

16. An image reader according to claim 15, wherein said beam attenuating means is a pervious filter.

17. An image reader according to claim 16, wherein said filter is disposed immediately before said photoelectric transferring means.

18. An image reader according to claim 17, wherein said photoelectric transferring means is formed of a plurality of photoelectric transferring pieces arranged linearly and said filter is formed of a plurality of filter parts having permeability coefficients varied correspondingly to said photoelectric transferring pieces.

19. An image reader according to claim 15, further comprising:

mode selecting means for selecting a projecting mode wherein the optical image of the microfilm is projected on said screen by said projecting means and a scanning mode wherein the optical image of the microfilm is scanned by said scanning means; and adjusting means for adjusting an amount of the light emitted by said light source in accordance with the mode selected by said mode selecting means so that the amount of light in the projecting mode is larger than the amount of the light in the scanning mode.

20. An image reader according to claim 19, wherein said adjusting means effects the adjustment when the selected mode is changed by said mode selecting means.

* * * * *